United States Patent
Sugawara

(10) Patent No.: US 8,736,994 B2
(45) Date of Patent: May 27, 2014

(54) DISK STORAGE APPARATUS AND WRITE CONTROL METHOD

(71) Applicant: Kabushiki Kaisha Toshiba, Tokyo (JP)

(72) Inventor: Nobuhiro Sugawara, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/710,071

(22) Filed: Dec. 10, 2012

(65) Prior Publication Data

US 2014/0022661 A1    Jan. 23, 2014

(30) Foreign Application Priority Data

Jul. 20, 2012   (JP) ................................. 2012-161468

(51) Int. Cl.
*G11B 5/02*   (2006.01)

(52) U.S. Cl.
USPC .............................................. 360/27; 360/31

(58) Field of Classification Search
None
See application file for complete search history.

(56) References Cited

U.S. PATENT DOCUMENTS

| 7,864,476 B2 | 1/2011 | Ehrlich |
| 7,916,421 B1 * | 3/2011 | Liikanen et al. ........... 360/77.01 |
| 2009/0154000 A1 | 6/2009 | Kojima |

FOREIGN PATENT DOCUMENTS

| JP | 04-124749 A | 4/1992 |
| JP | 2009-146500 A | 7/2009 |
| JP | 2009-230846 A | 10/2009 |
| JP | 2011-129213 A | 6/2011 |

* cited by examiner

*Primary Examiner* — Paul Huber
(74) *Attorney, Agent, or Firm* — Knobbe, Martens, Olson & Bear LLP

(57) ABSTRACT

According to one embodiment, a disk storage apparatus includes a first storage device, a second storage device, and a controller. The first storage device stores data for use in determining influence imposed on tracks peripheral to a designated track in which data should be written on a disk. The second storage device has a nonvolatile cache area for temporarily storing data. The controller performs a cache process of storing the data in the nonvolatile cache area if the influence is determined, from the data, to exceed a reference value, in preparation for writing the data in the designated track.

12 Claims, 6 Drawing Sheets

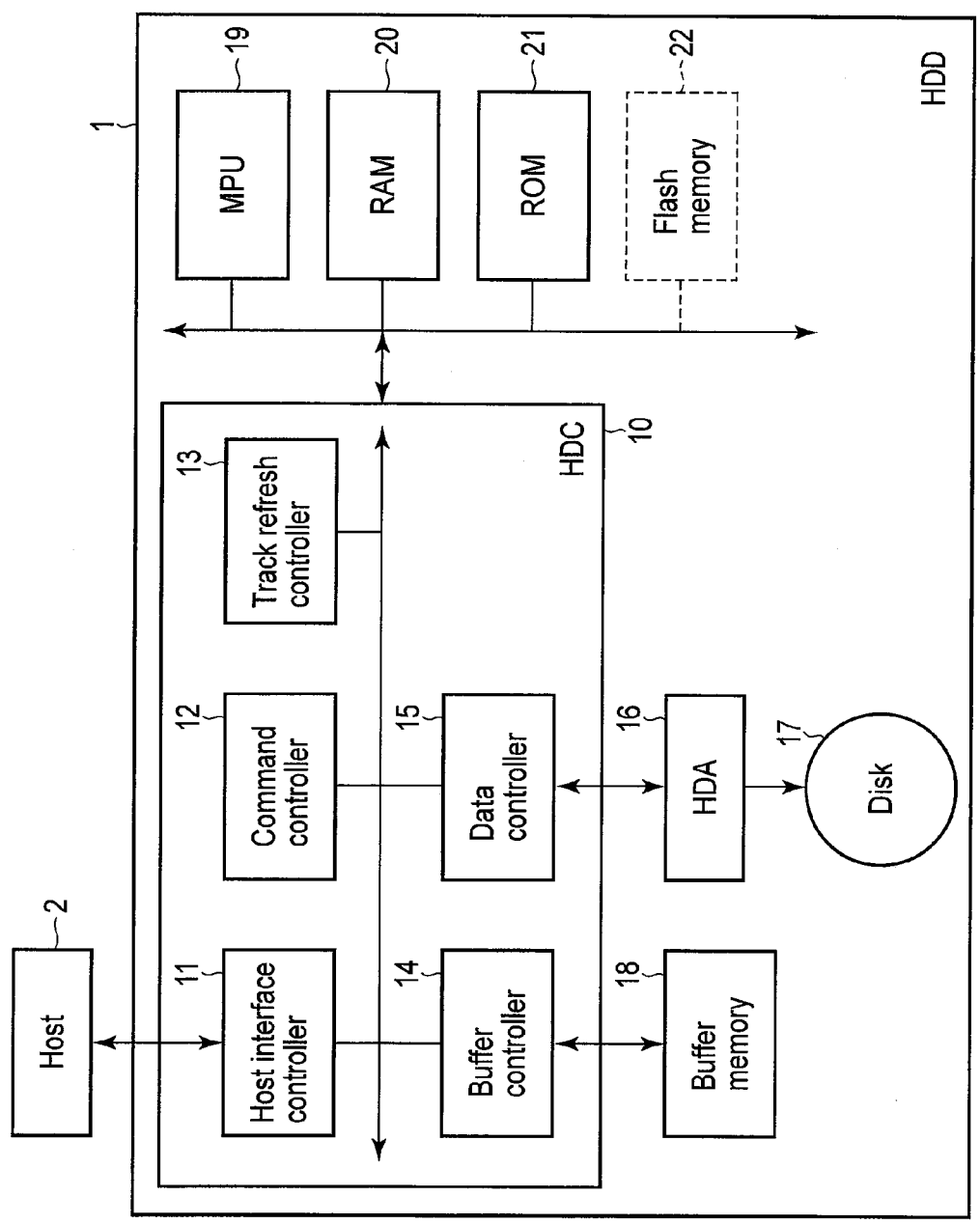
F I G. 1

| Track No. | 0 | ~ | 77 | 78 | 79 | 80 | 81 | 82 | 83 | 84 | 85 | 86 | 87 | 88 | 89 | 90 | 91 | 92 | ~ |
|---|---|---|---|---|---|---|---|---|---|---|---|---|---|---|---|---|---|---|---|
| Number of times data has been written | 0 | ~ | 0 | 0 | 0 | 0 | 0 | 0 | 0 | 0 | 0 | 0 | 0 | 0 | 0 | 0 | 0 | 0 | ~ |
302
F I G. 4
| Track No. | 0 | ~ | 77 | 78 | 79 | 80 | 81 | 82 | 83 | 84 | 85 | 86 | 87 | 88 | 89 | 90 | 91 | 92 | ~ |
|---|---|---|---|---|---|---|---|---|---|---|---|---|---|---|---|---|---|---|---|
| Recorded value of peripheral influence | 0 | ~ | 0 | 0 | 0 | 0 | 0 | 0 | 0 | 0 | 0 | 0 | 0 | 0 | 0 | 0 | 0 | 0 | ~ |
304
F I G. 5
Data writing in track No.86       302  
| Track No. | 0 | ~ | 77 | 78 | 79 | 80 | 81 | 82 | 83 | 84 | 85 | 86 | 87 | 88 | 89 | 90 | 91 | 92 | ~ |
|---|---|---|---|---|---|---|---|---|---|---|---|---|---|---|---|---|---|---|---|
| Number of times data has been written | 0 | ~ | 0 | 0 | 0 | 1 | 2 | 3 | 4 | 7 | 10 | 0 | 10 | 7 | 4 | 3 | 2 | 1 | ~ |
| Values in write-count weight table | 0 | ~ | 0 | 0 | 0 | 1 | 2 | 3 | 4 | 7 | 10 |   | 10 | 7 | 4 | 3 | 2 | 1 | ~ |
303
F I G. 6
304  
| Track No. | 0 | ~ | 77 | 78 | 79 | 80 | 81 | 82 | 83 | 84 | 85 | 86 | 87 | 88 | 89 | 90 | 91 | 92 | ~ |
|---|---|---|---|---|---|---|---|---|---|---|---|---|---|---|---|---|---|---|---|
| Recorded value of peripheral influence | 0 | ~ | 0 | 0 | 0 | 0 | 0 | 0 | 0 | 0 | 0 | 54 | 0 | 0 | 0 | 0 | 0 | 0 | ~ |
F I G. 7

| Track No. | 0 | ~ | 77 | 78 | 79 | 80 | 81 | 82 | 83 | 84 | 85 | 86 | 87 | 88 | 89 | 90 | 91 | 92 | ~ |
|---|---|---|---|---|---|---|---|---|---|---|---|---|---|---|---|---|---|---|---|
| Recorded value of peripheral influence | 0 | ~ | 0 | 0 | 0 | 0 | 0 | 0 | 44 | 54 | 0 | 44 | 0 | 0 | 0 | 0 | 0 | 0 | ~ |

304

F I G. 1 1

Data writing in track No.86  302

| Track No. | 0 | ~ | 77 | 78 | 79 | 80 | 81 | 82 | 83 | 84 | 85 | 86 | 87 | 88 | 89 | 90 | 91 | 92 | ~ |
|---|---|---|---|---|---|---|---|---|---|---|---|---|---|---|---|---|---|---|---|
| Number of times data has been written | 0 | ~ | 1 | 3 | 5 | 9 | 15 | 23 | 14 | 7 | 37 | 0 | 27 | 19 | 11 | 7 | 4 | 2 | ~ |
| Values in write-count weight table | 0 | ~ | 0 | 0 | 0 | 1 | 2 | 3 | 4 | 7 | 10 |  | 10 | 7 | 4 | 3 | 2 | 1 | ~ |

303

F I G. 1 2

| Track No. | 0 | ~ | 77 | 78 | 79 | 80 | 81 | 82 | 83 | 84 | 85 | 86 | 87 | 88 | 89 | 90 | 91 | 92 | ~ |
|---|---|---|---|---|---|---|---|---|---|---|---|---|---|---|---|---|---|---|---|
| Recorded value of peripheral influence | 0 | ~ | 0 | 0 | 0 | 0 | 0 | 0 | 41 | 47 | 0 | 98 | 0 | 0 | 0 | 0 | 0 | 0 | ~ |

304

F I G. 1 3

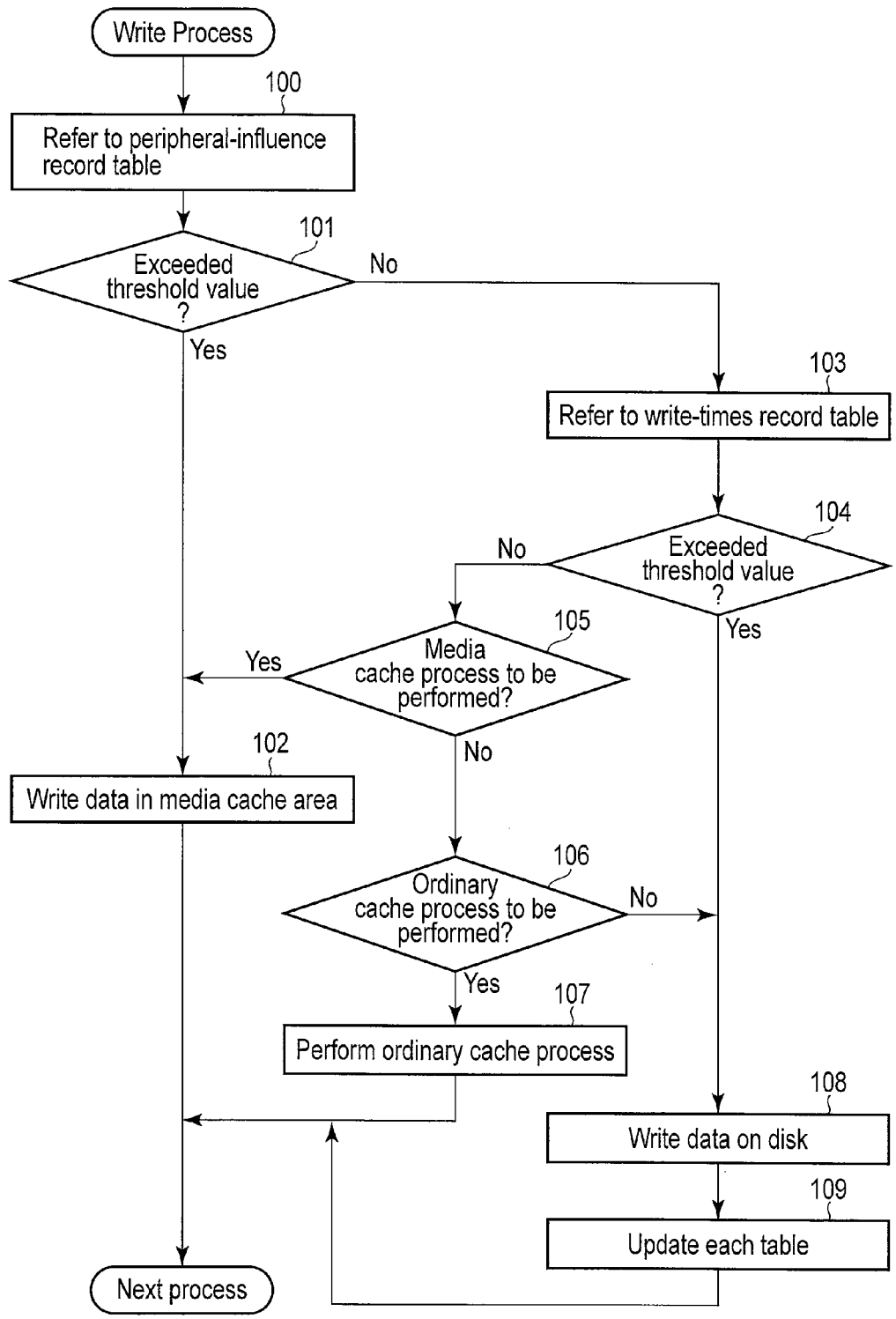
F I G. 14

DISK STORAGE APPARATUS AND WRITE CONTROL METHOD

CROSS-REFERENCE TO RELATED APPLICATIONS

This application is based upon and claims the benefit of priority from Japanese Patent Application No. 2012-161468, filed Jul. 20, 2012, the entire contents of which are incorporated herein by reference.

FIELD

Embodiments described herein relate generally to a disk storage apparatus having a cache function and a write control method.

BACKGROUND

In recent years, tracks are provided on a disk in a higher density to increase the storage capacity in the field of disk storage apparatuses a representative example of which is a hard disk drive (HDD in some instances). On any disk having tracks arranged in a high density, the more times data has been written in one track, the magnetic recording in either peripheral track will be degraded, due to the influence the recording magnetic field imposes during the data writing. The degradation of the magnetic recording may result in read errors.

For addressing the influence imposed on either peripheral track (adjacent track interference [ATI]), a method (anti-ATI measures) has been proposed, in which a track refresh process is performed. In the track refresh process, the times data has been written each track on a disk is counted and the data recorded in the track is refreshed in accordance with the number of times data has been written in the track.

The track refresh process is a process designed to update the data recorded in any track if data has been recorded in the track more times than a reference value (threshold value). More specifically, the data thus far recorded is read from the track and then is written again in the track (thereby refreshing the track with the same data).

The track refresh process is performed while the HDD is idling, in order to reduce the load on the ordinary read/write process. If the recording magnetic field influences either peripheral track very much, however, the ordinary read/write process must be interrupted and the track refresh process must then be immediately performed, even while the HDD keeps operating.

BRIEF DESCRIPTION OF THE DRAWINGS

FIG. 1 is a block diagram explaining the configuration of a disk drive according to an embodiment;

FIG. 4 is a diagram explaining write-times record table according to the embodiment;

FIG. 5 is a diagram explaining peripheral-influence record table according to the embodiment;

FIG. 6 is a diagram explaining exemplary contents of the write-count weight table and write-count record table during the write process performed in the embodiment;

FIG. 7 is a diagram explaining an exemplary content of the peripheral-influence record table during the write process performed in the embodiment;

FIG. 11 is a diagram explaining an exemplary content of the peripheral-influence record table during the write process performed in the embodiment;

FIG. 12 is a diagram explaining exemplary contents of the write-count weight table and write-times record table during the write process performed in the embodiment;

FIG. 13 a diagram explaining an exemplary content of the peripheral-influence record table during the write process performed in the embodiment; and FIG. 14 is a flowchart explaining how a write control process is performed in the embodiment.

DETAILED DESCRIPTION

Figures 2, 3:
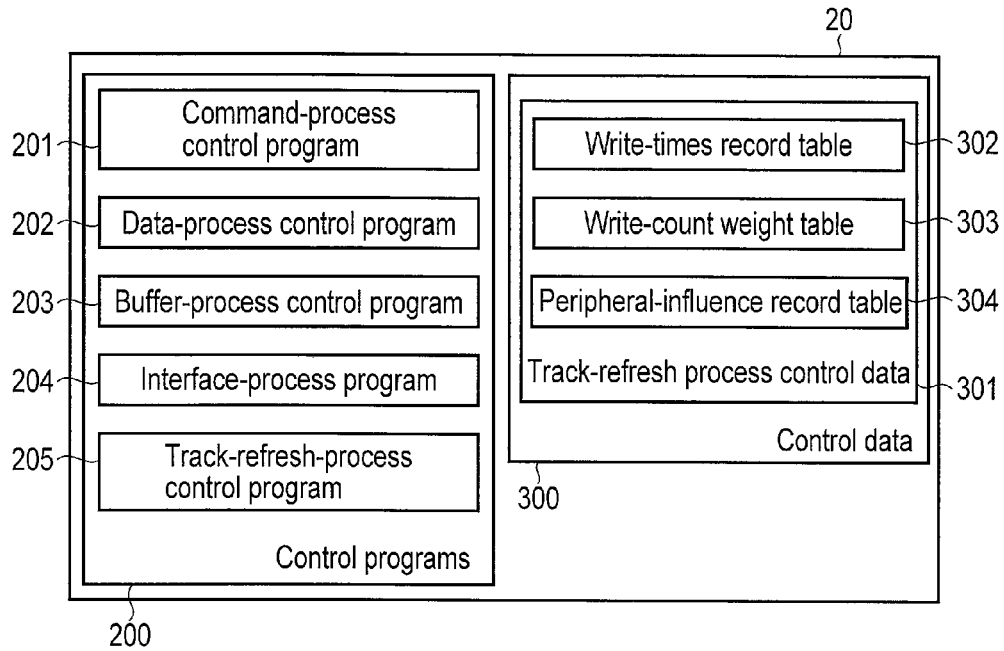
FIG. 2 is a diagram explaining programs and data stored in RAM according to the embodiment.
FIG. 3 is a diagram explaining write-count weight table according to the embodiment.

In general, according to one embodiment, a disk storage apparatus includes a first storage device, a second storage device, and a controller. The first storage device stores data for use in determining influence imposed on tracks peripheral to a designated track in which data should be written on a disk. The second storage device has a nonvolatile cache area for temporarily storing data. The controller performs a cache process of storing the data in the nonvolatile cache area if the influence is determined, from the data, to exceed a reference value, in preparation for writing the data in the designated track.

Various embodiments will be described hereinafter with reference to the accompanying drawings.

[Configuration of the Disk Storage Apparatus]

FIG. 1 is a block diagram showing the major components of a disk storage apparatus (hereinafter referred to as a disk drive) according to an embodiment.

As seen from FIG. 1, the disk drive 1 is a hard disk drive (HDD). The disk drive 1 has a hard disk controller (HDC) 10, a head-disk assembly (HDA) 16, a disk 17, a buffer memory (i.e., dynamic random access memory, DRAM) 18, a microprocessor (MPU) 19, and a programmable memory (random access memory, RAM) 20, and a read only memory (ROM) 21. The disk drive 1 may incorporate a flash memory 22 that is a nonvolatile memory.

The HDA 16 is a mechanism designed to write data on, and read data from, the disk 17 that is a magnetic recording medium. The HDA 16 includes a spindle motor, a head, an actuator and a head amplifier IC. The spindle motor is an electric motor configured to rotate the disk 17. The head performs magnetic data recording/reproducing on the disk 17. The actuator holds the head, and performs a seek operation to position the head over the disk. The head amplifier IC supplies a write signal to, and receives a read signal from, the head.

The MPU 19 is the main controller in the disk drive 1, and performs a write control, a cache process control, and a track refresh process, all according to this embodiment, as will be described later. The RAM 20 is a memory configured to store control programs and control data according to this embodiment, as will be described later. The ROM 21 stores, for example, the operating program for the MPU 19.

The HDC 10 is configured to perform, under the control of the MPU 18, a write process to write the write data received from a host 2 on the disk 17 and a read process to read data from the disk and transfers the data to the host 2. The HDC 10 has a host interface controller 11, a command controller 12, a track refresh controller 13, a buffer controller 14, and a data controller 15.

The host interface controller 11 controls the transfer of data and commands between the disk drive 1 and the host 2. The host 2 is, for example, the interface controller of the Serial ATA (SATA) or Serial attached SCSI (SAS) standard incorporated in, for example, a personal computer or a server. When controlled by the MPU 19, the command controller 12 performs a control, decoding a command (e.g., write command or read command) received from the host 2, and transmitting the command to the MPU 19.

The track refresh controller 13 controls the track refresh process as it is controlled by the MPU 19. Under the control of the MPU 19, the buffer controller 14 performs a control to write the data (write data) received from the host 2 or the data (read data) read from the disk 17 in the buffer memory 18. The buffer controller 14 also performs a control to read data from the buffer memory 18. The buffer memory 18 temporarily holds the write data or the read data during the data transfer control.

The data controller 15 has a read/write channel through which to a read signal and a write signal may be supplied to and from the head incorporated in the HDA 16. That is, the data controller 15 performs a read/write control under the control of the MPU 19, to write the write data on the disk 17 and to read the read data from the disk 17.

As shown in FIG. 2, the RAM 20 stores a control program group 200 and a control data group 300. The control program group 200 includes a command-process control program 201, a data-process control program 202, a buffer-process control program 203, an interface (I/F)-process program 204, and a track-refresh-process control program 205.

The command-process control program 201 is a program that the command controller 12 and MPU 19 execute to perform a command process. The data-process control program 202 is a program that the data controller 15 and MPU 19 execute to perform the read/write control. The buffer-process control program 203 is a program that the buffer controller 14 and MPU 19 execute to control the buffer memory 18. The interface-process program 204 is a program that the host interface controller 11 and MPU 19 execute to control the data transfer. The track-refresh-process control program 205 is a program that the track refresh controller 13 and MPU 19 execute to control the track refresh process.

The control data group 300 has track-refresh process control data 301. The track-refresh process control data 301 includes a write-times record table 302, a write-count weight table 303, and a peripheral-influence record table 304. The write-times record table 302 is a table holding the number of times the data has been written in each track of the disk 17. The write-count weight table 303 is a table showing the relation between the peripheral influence the data write at a track imposes on either peripheral track, on the one hand, and the distance between the track and either peripheral track, on the other. The peripheral-influence record table 304 is a table showing the influence the data write at a track imposes on either peripheral track, which has been calculated on the basis of the write-count weight table 303.

[Write Control]

The write control according to the embodiment will be explained with reference to FIG. 3 to FIG. 13 and the flowchart of FIG. 14.

The track refresh controller 13 of the HDC 10 uses the track-refresh process control data 301, performing a track refresh process. The track refresh process is a process of updating the date recorded in a track in order to avoid a decrease in the magnetic recording intensity at the track. To be more specific, the data is read from the track and written again in the track in the track refresh process (in other words, the data is refreshed in the track).

The track-refresh process control data 301 contains the write-count weight table 303 shown in FIG. 3. The write-count weight table 303 shows the write count weights of the tracks (i.e., data-written tracks) in which data has been written. Each write count weight represents the relation between the adverse influence (influence value) the data written in a track (i.e., data-written track) imposes on either peripheral track, on the one hand, and the distance between the data-written track and either peripheral track, on the other.

As shown in FIG. 3, the two tacks immediately adjacent to the track in which data is being written, are at distances 1 and −1, respectively, from the that tack. The adverse influence imposes on these peripheral tracks have maximum value 10. The longer the distance (e.g., 6 or −6) any other track is from the track in which data is being written, the smaller influence the track will have (e.g., 1, 2, 4 or 7, as shown in FIG. 3).

The track-refresh process control data 301 further contains the write-times record table 302 shown in FIG. 4. The write-times record table 302 shows the number of times data has been written in each track on the disk 1. (The table 302 shows values, each indicating how many times data has been written in a track, in comparison with the data written in, for example, the tracks No. 0 to No. 92.) Every time data is written in any track, the write count weight of the track increases by one (1) in the write-count weight table 303. Note that FIG. 4 shows the write-times record table 302 in the initial state, holding value 0 for every track.

In the embodiment, the track-refresh process control data 301 further contains the peripheral-influence record table 304 shown in FIG. 5. The peripheral-influence record table 304 shows the influence the data write at each track imposes on either peripheral track. More precisely, the write-count weights for each track, accumulated in the write-count weight table 303, are recorded, as peripheral-influence value, in the peripheral-influence record table 304. Note that FIG. 5 shows the peripheral-influence record table 304 in the initial state, holding value 0 for every track.

How the write-times record table 302, write-count weight table 303 and peripheral-influence record table 304 change as the write process is performed on the disk 17 will be explained in detail, with reference to FIG. 6 to FIG. 13. In this regard it should be noted that these table 302 to 304 are updated by the MPU 19.

FIG. 6 shows the states the write-times record table 302 and write-count weight table 303 assume if data is written in the track No. 86 of the disk 17. More precisely, the degrees of the influence the data write at the track No. 86 imposes the peripheral tracks are recorded in the write-count weight table 303. Further, the values recorded in the write-count weight table 303 are added to the values recorded in the write-times record table 302 for the respective tracks, except the value for the track No. 86. Note that the write-times at the track No. 86 is zero (0), because the data has been refreshed in the track No. 86.

FIG. 7 shows the state the peripheral-influence record table 304 assumes if data is written in the track No. 86. That is, the sum of the values recorded in the write-count weight table 303 for the all tracks peripheral to the track No. 86 (i.e., 54=1+2+3+4+7+10+10+7+4+3+2+1) is set as peripheral influence for the track No. 86 in which data should be written.

The track No. 86 can be assumed to have been refreshed, cancelling the influence from the peripheral tracks.

To be more specific, the peripheral influence imposed on either peripheral track is obtained by subtracting the influence D the peripheral track imposes on the track in which data is being written (i.e., track No. 86), from the recorded peripheral influence. The influence D is calculated as follows:

$$D=(C/B) \times A \qquad (1)$$

where A is the influence that the track in which data is being written imposes on either peripheral track, B is the sum of the values in the write-count weight table 303, and C is the write-count weight according to the distance from the track in which data is being written.

In the case of FIG. 6 and FIG. 7, the influences D of tracks Nos. 80 and 92 are 54×(1/54), the influences D of the tracks Nos. 81 and 91 are 54×(2/54), the influences D of the tracks 82 and 90 are 54×(3/54), the influences D of the tracks 83 and 89 are 54×(5/54), the influences D of the tracks 84 and 88 are 54×(7/54), and the influences D of the tracks 85 and 87 are 54×(10/54). The influence that the track in which data is being written imposes on any peripheral track is zero (0). If any one of the influence values D (1, 2, 3, 4, 7 and 10) is subtracted from this influence, the difference will be a negative value. As a result, the recorded influence value of the track in which data is being written will be 0.

Figure 8:
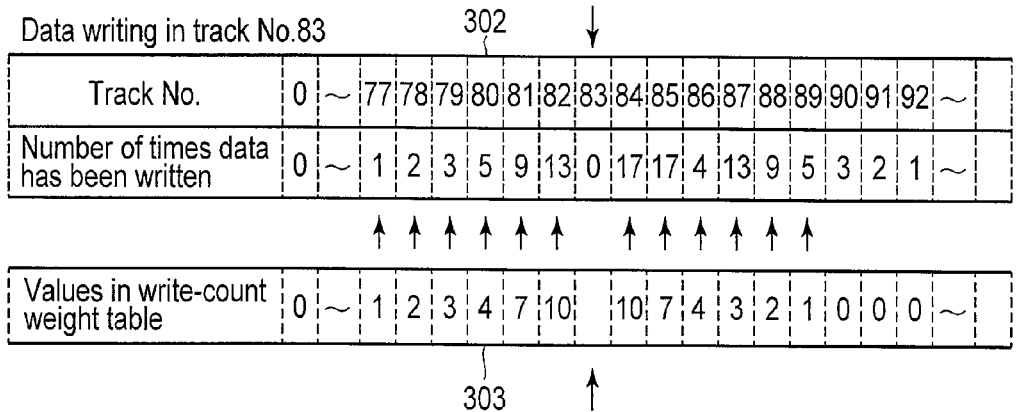
FIG. 8 is a diagram explaining exemplary contents of the write-count weight table and write-times record table during the write process performed in the embodiment.
Figure 9:
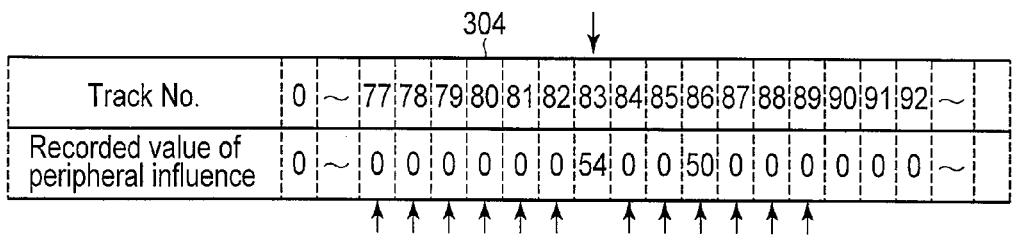
FIG. 9 is a diagram explaining an exemplary content of the peripheral-influence record table during the write process performed in the embodiment.

FIG. 8 shows the states that the write-times record table 302 and write-count weight table 303 assume if data is written in the track No. 83 of disk 17. FIG. 9 shows the state the peripheral-influence record table 304 assumes if data is written in the track No. 83.

As seen from FIG. 8, the write-times for the track No. 83 become zero (0) in the write-times record table 302, because data has been written in this track in the track refresh process. At the same time, the values in the write-count weight table 303, for the tracks peripheral to the track No. 83, are added to the associated values in the write-times record table 302, respectively. At this point, value 4 is recorded for the track No. 86 in the write-count weight table 303 is recorded also in the write-times record table 302, because 4 is the distance from the track No. 86 to the data-written track No. 83 (i.e., reference position).

Then, as shown in FIG. 9, the sum of the values recorded in the write-count weight table 303 for the all tracks (Nos. 77 to 82 and Nos. 84 to 89) peripheral to the track No. 83 (i.e., 54=1+2+3+4+7+10+10+7+4+3+2+1) is set as peripheral influence for the track No. 83 in which data should be written. Further, the peripheral influence imposed on any peripheral track is obtained by subtracting the influence D imposed on the data-written track No. 83 from the recorded peripheral influence. In this case, the influences D of tracks No. 86 is 54×(4/54).

Hence, the peripheral influence imposed on the track No. 86 is 50, which is obtained by subtracting 4 from 54, i.e., the peripheral influence recorded at present.

Figure 10:
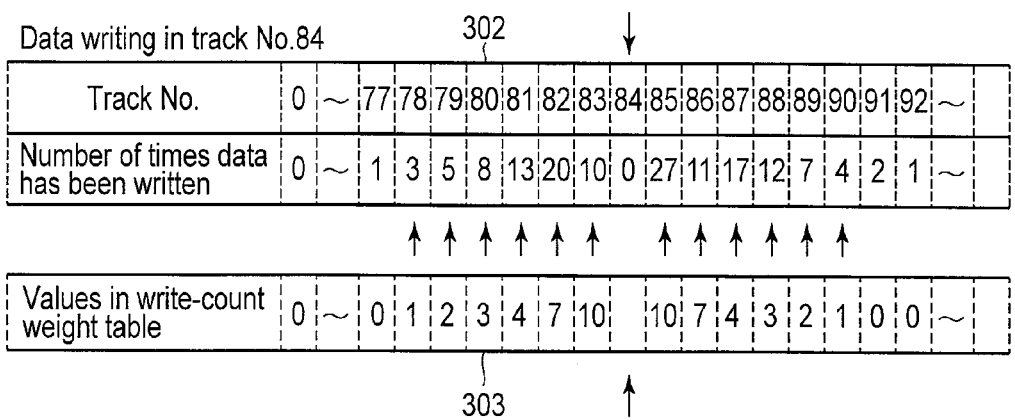
FIG. 10 is a diagram explaining exemplary contents of the write-count weight table and write-times record table during the write process performed in the embodiment.

FIG. 10 shows the states that the write-times record table 302 and write-count weight table 303 assume if data is written in the track No. 84 of disk 17. FIG. 11 shows the state the peripheral-influence record table 304 assumes if data is written in the track No. 84.

As seen from FIG. 10, the write-times for the track No. 84 become zero (0) in the write-times record table 302, because data has been written in this track in the track refresh process. At the same time, the values in the write-count weight table 303, for the tracks peripheral to the track No. 84, are added to the associated values in the write-times record table 302, respectively. At this point, value 10 recorded for the track No. 83 in the write-count weight table 303 is recorded also in the write-times record table 302, because 10 is the distance from the data-written track No. 83 to the track No. 84 (i.e., reference position). Also, value 7 recorded for the track No. 86 in the write-count weight table 303 is recorded also in the write-times record table 302, because 7 is the distance from the data-written track No. 86 to the track No. 84 (i.e., reference position).

Then, as shown in FIG. 11, the sum of the values recorded in the write-count weight table 303 for the all tracks (Nos. 78 to 83 and Nos. 85 to 90) peripheral to the track No. 84 (i.e., 54=1+2+3+4+7+10+10+7+4+3+2+1) is set as peripheral influence for the track No. 84 in which data should be written. Further, the peripheral influence imposed on any peripheral track is obtained by subtracting the influence D imposed on the data-written track No. 84 from the recorded peripheral influence.

In this case, the influence D of the peripheral track No. 83 is 54×(10/54). Therefore, the peripheral influence imposed on the peripheral track No. 83 is 44, which is obtained by subtracting 10 from 54, i.e., the peripheral influence recorded at present, and the peripheral influence D of the peripheral track No. 86 is 50×(7/54). Hence, the peripheral influence imposed on the peripheral track No. 86 is 44, which is obtained by subtracting the peripheral influence D (about 6) from 50, i.e., the peripheral influence recorded at present.

FIG. 12 shows the states that the write-times record table 302 and write-count weight table 303 assume if data is written in the track No. 86 of disk 17. FIG. 13 shows the state the peripheral-influence record table 304 assumes if data is written in the track No. 86.

As seen from FIG. 12, the write-times for the track No. 86 become zero in the write-times record table 302, because data has been written in this track in the track refresh process. At the same time, the values in the write-count weight table 303, for the tracks peripheral to the track No. 86, are added to the associated values in the write-times record table 302, respectively. At this point, value 4 recorded for the track No. 83 in the write-count weight table 303 is recorded also in the write-times record table 302, because 4 is the distance from the data-written track No. 83 to the track No. 86 (i.e., reference position). Also, value 7 recorded for the track No. 84 in the write-count weight table 303 is recorded also in the write-times record table 302, because 7 is the distance from the data-written track No. 84 to the track No. 86 (i.e., reference position).

Then, as shown in FIG. 13, the sum of the values recorded in the write-count weight table 303 for the all tracks (Nos. 80 to 85 and Nos. 87 to 92) peripheral to the track No. 86 (i.e., 54=1+2+3+4+7+10+10+7+4+3+2+1) is set as peripheral influence for the track No. 86 in which data should be written. Further, the peripheral influence imposed on any peripheral track is obtained by subtracting the influence D imposed on the data-written track No. 86 from the recorded peripheral influence.

In this case, the influence D of the peripheral track No. 83 is 44×(4/54). Therefore, the peripheral influence imposed on the peripheral track No. 83 is 41, which is obtained by subtracting the influence D (about 3) from 44, i.e., the peripheral influence recorded at present, and the peripheral influence D of the peripheral track No. 84 is 54×(7/54). Hence, the peripheral influence imposed on the peripheral track No. 84 is 47, which is obtained by subtracting the peripheral influence D (about 7) from 54, i.e., the peripheral influence recorded at present.

As has been described, the embodiment includes the peripheral-influence record table 304 as track-refresh process control data 301, in addition to the write-times record table 302 and write-count weight table 303. The peripheral-influence record table 304 shows the sum of influences imposed on the tracks peripheral to the track in which data should be written (i.e., weight of write times). Therefore, the MPU 19 can determine whether the frequency of writing data in the track much influences the peripheral tracks, by referring to the peripheral-influence record table 304.

How the MPU 19 performs the write control will be explained with reference to the flowchart of F 14.

On receiving a write command from the host 2, the HDC gives the command to the MPU 19. The MPU 19 starts the process of writing the write data. Then, the HDC 10 stores the write data in the buffer memory 18, together with the write command coming from the host 2.

On starting the process of writing the write data, the MPU 19 refers to the peripheral-influence record table 304 stored in the RAM 20, acquiring the peripheral influence value recorded for the track designated by the write command (e.g., track No. 86) (Block 100).

The MPU 19 then compares the peripheral influence value recorded for the track in which data should be written (i.e., track No. 86) with a prescribed threshold value (reference value), determining whether the peripheral influence value has exceeded the threshold value (Block 101). Since frequency of writing data in the track in question greatly influences the peripheral tracks, a write cache process will be preferentially performed if the peripheral influence value exceeds the threshold value. The threshold value has been set based on the experiments or simulation conducted beforehand. Note that influence on any peripheral track is a decrease in the magnetic recording intensity at the peripheral track.

If the peripheral influence value has exceeded the threshold value (YES in Block 101), the MPU 19 performs a media cache process (Block 102). That is, the MPU 19 performs a control, writing the write data stored in the buffer memory 18 in the media cache area (i.e., temporary storage area) provided on the disk 17.

On the other hand, if the peripheral influence value has not exceeded the threshold value (NO in Block 101), the MPU 19 refers to the write-times record table 302 (Block 103). The MPU 19 then compares the number of times data has been written in the track, with a prescribed threshold value (fixed value), determining whether the number of times has exceeded the threshold value (Block 104). If the number of times has exceeded the threshold value (NO in Block 104), the MPU 19 determines whether a media cache process has been set to be performed (Block 105).

If the media cache process has been set (YES in Block 105), the MPU 19 performs a control, writing the write data stored in the buffer memory 18 on the media cache area provided on the disk 17 (Block 102). If the cache process has not been set (NO in Block 105) and if a normal cache process has been set (YES in Block 106), the MPU 19 performs the ordinary cache process (Block 107). In the normal cache process, the MPU 19 uses the flash memory 22 as cache area as shown in FIG. 1, and performs a control, writing in the flash memory 22 the write data stored in the buffer memory 18.

In the embodiment, the MPU 19 controls the HDC 10, not performing the cache process, but writing data in that track of the disk 17 which has been designated by the write command (Block 108), if the number of times data has been written has exceeded the threshold value (YES in Block 104). After writing the data in the disk 17, the MPU 19 updates the write-times record table 302, write-count weight table 303 and peripheral-influence record table 304 (Block 109).

In the embodiment described above, the media cache process is performed if the peripheral influence the track in which data should be written imposes on the peripheral tracks exceeds the threshold value. The frequency of writing data in the track is therefore lowered, reducing the influence the track imposes on the peripheral tracks. This can lower the frequency of preferentially performing the track refresh process, i.e., measures against the peripheral influence. Hence, the ordinary read/write process can be improved in performance. Further, an effective write control can be performed since a relatively large cache area on the disk 17 can be utilized in the media cache process.

Moreover, if the number of times data has been recorded in a specific track has exceeded a threshold value, data is preferentially written in the track, without performing any cache process, thereby refreshing the track and resetting said number of times. Also in this case, it is possible to lower the track refresh process, i.e., measures against the peripheral influence.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A disk storage apparatus comprising:
   a first storage device configured to store data for use in determining influence imposed on tracks peripheral to a designated track in which data should be written on a disk;
   a second storage device comprising a nonvolatile cache area for temporarily storing data; and
   a controller configured to perform a cache process of storing the data in the nonvolatile cache area if the influence is determined, from the data, to exceed a reference value, in preparation for writing the data in the designated track.

2. The disk storage apparatus of claim 1, wherein the nonvolatile cache area is a cache area on the disk, and the controller performs a cache process of storing the data to be written in the designated track, in the cache area on the disk.

3. The disk storage apparatus of claim 1, wherein the controller performs a preset cache process if the influence is not determined to exceed the reference value.

4. The disk storage apparatus of claim 1, wherein the controller writes the data in the designated track on the disk without performing the cache process if the influence is not determined to exceed the reference value.

5. The disk storage apparatus of claim 1, further comprising a third storage device configured to store, for each track, a weight value indicating influence imposed on the peripheral tracks and proportional to the number of times data has been written in the track, the weigh value being based on the distance from the designated track,
   wherein the controller uses the weight value to calculate the sum of the weight values of the each peripheral track, as data associated with the designated track, and stores the sum of the weight values in the first storage device.

6. The disk storage apparatus of claim 1, wherein the controller performs a refresh process of refreshing the data stored in the designated track, and performs the cache process without performing the refresh process, if the influence is determined, from the data, to exceed the reference value.

7. A write control method for use in a disk storage apparatus, the method comprising:
   storing data for use in determining influence imposed on tracks peripheral to a designated track in which data should be written on a disk, in preparation for writing the data in the designated track; and
   performing a cache process of storing the data in a nonvolatile cache area if the influence is determined, from the data, to exceed a reference value.

8. The method of claim 7, wherein the nonvolatile cache area is a cache area provided on the disk, and in the cache process, the data to be written in the designated track is stored in the cache area provided on the disk.

9. The method of claim 7, further comprising performing a preset cache process if the influence is not determined to exceed the reference value.

10. The method of claim 7, further comprising writing data, without performing the cache process, in the designated track on the disk if the influence is not determined to exceed the reference value.

11. The method of claim 7, further comprising:
   storing, for each track, a weight value indicating influence imposed on the peripheral tracks and proportional to the number of times data has been written in the track, the weigh value being based on the distance from the designated track; and
   using the weight value to calculate the sum of the weight values of the each peripheral track, as data associated with the designated track, and storing the sum of the weight values.

12. The method of claim 7, further comprising:
   performing a refresh process of refreshing the data stored in the designated track, and
   performing the cache process without performing the refresh process, if the influence is determined, from the data, to exceed the reference value.

* * * * *